United States Patent [19]

Domic et al.

[11] Patent Number: 4,561,887

[45] Date of Patent: Dec. 31, 1985

[54] PROCESS FOR RECOVERING METALS FROM SOLUTION THROUGH SOLVENT EXTRACTION AND PYROMETALLURGICAL REDUCTION

[75] Inventors: Esteban M. Domic; Hans C. Hein, both of Santiago, Chile

[73] Assignee: Sociedad Minera Pudahuel Ltda., C.P.A., Santiago, Chile

[21] Appl. No.: 634,770

[22] Filed: Jul. 26, 1984

Related U.S. Application Data

[63] Continuation-in-part of Ser. No. 400,875, Jul. 22, 1982, abandoned.

[51] Int. Cl.$^4$ ............................................. C22B 15/00
[52] U.S. Cl. ...................................... 75/65 R; 75/72; 75/117
[58] Field of Search ..................... 75/117, 119, 72, 65

[56] References Cited

U.S. PATENT DOCUMENTS

| | | | |
|---|---|---|---|
| 1,663,091 | 6/1977 | Greenawalt | 75/72 |
| 4,039,405 | 8/1977 | Wong | 423/24 |
| 4,203,964 | 5/1980 | Reinhardt | 423/DIG. 14 |
| 4,214,901 | 7/1980 | Michal | 75/119 |
| 4,278,642 | 7/1981 | MacInnis | 75/101 E |

FOREIGN PATENT DOCUMENTS

| | | | |
|---|---|---|---|
| 1558402 | 6/1971 | Fed. Rep. of Germany | 75/74 |
| 2900 | of 1859 | United Kingdom | 75/72 |

OTHER PUBLICATIONS

Flett, "Solvent Extraction in Copper Hydrometallurgy: A Review" *Transactions Mineral Processing & Extractive Metallurgy,* Sec. C, Mar. 1974, pp. C30–36.

Merriman, *A Dictionary of Metallurgy,* MacDonald and Evans Ltd., London, (1958), pp. 100–103, 315.

Peters, *The Practice of Copper Smelting,* McGraw-Hill NY, (1911), p. 11P.

"Purification of Manganese Solutions Containing Copper and Zinc by Liquid-Liquid Extraction, Using Di-(-2-Ethylhexyl) Phosphoric Acid" by G. M. Ritcey and B. H. Lucas, *Canadian Metallurgical Quarterly,* vol. 10, No. 3, (1971).

"A New Generation Copper Extractant" by G. A. Kordosky, K. D. MacKay, and M. J. Virnig, presented at the AIME Annual Meeting, Las Vegas, Nevada (Feb. 22-26, 1976).

Pp. 498 and 499 of "Introduction to Metallurgy" by Joseph Newton, John Wiley & Sons, Inc., New York, (1947).

"Copper Sulfate Via Solvent Extraction and Crystallization" by Henry R. Moyer, III, presented at AIME Annual Meeting in New Orleans, Louisiana, Feb. 18 to 22, 1979.

*Primary Examiner*—Peter D. Rosenberg
*Attorney, Agent, or Firm*—Christie, Parker & Hale

[57] ABSTRACT

Solvent extraction is used for selective recovery of a dissolved metal such as copper from an aqueous solution of metals by means of an organic liquid, immiscible with the aqueous solution and selective for the metal of interest. The metal is extracted from the organic liquid by means of another aqueous stripping solution. The metal values are sufficiently concentrated in the aqueous stripping solution to get continuous precipitation of a metal salt in a substantially pure form. The metal salt is separated, rinsed, and dried to form an intermediate product. Preferably, the metal salt is a sulfate which is then dehydrated and thermally decomposed to form metal oxide and sulfur dioxide. The metal oxide may be also considered as an intermediate product. It is also desirable to pyrometallurgically reduce the metal oxide until pure metal powder is obtained, or it may be cast into ingots.

23 Claims, 1 Drawing Figure

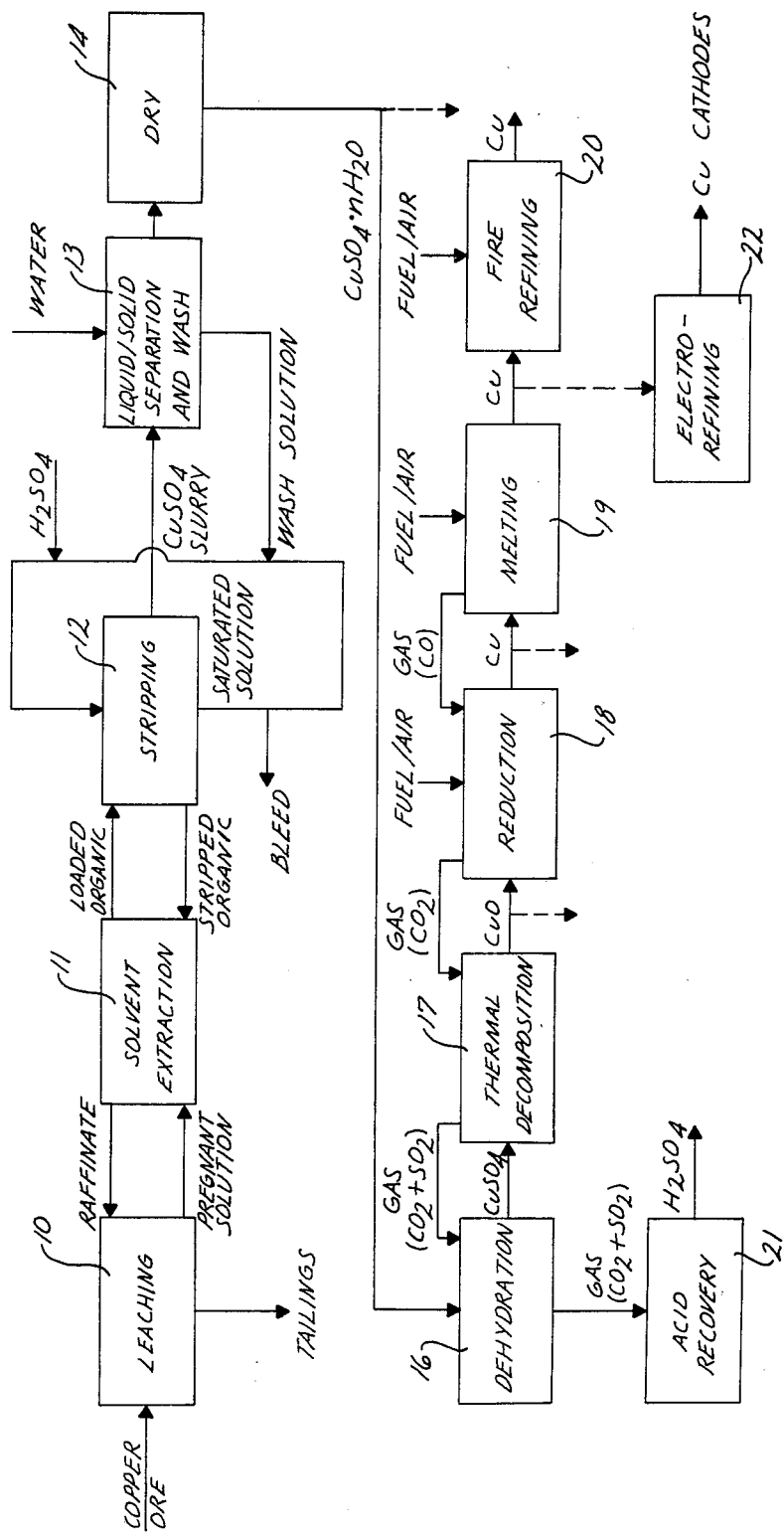

PROCESS FOR RECOVERING METALS FROM SOLUTION THROUGH SOLVENT EXTRACTION AND PYROMETALLURGICAL REDUCTION

CROSS REFERENCE TO RELATED APPLICATIONS

This application is a continuation-in-part of U.S. patent application Ser. No. 400,875, filed July 22, 1982, now abandoned.

FIELD OF THE INVENTION

This invention relates to recovery of metals from aqueous metal bearing solutions. These aqueous solutions come from scrap dissolution, from minerals leaching, as bleed from other processes, from mine waters, etc. The first metal recovery step is performed by means of the conventional process of solvent extraction. That is, the metal of interest is selectively extracted from the aqueous metal bearing solution by means of a suitable organic reagent. The loaded organic reagent is unloaded by means of another high purity aqueous solution, from which the metal of interest is recovered in subsequent steps.

The present invention is characterized by recovering the metal of interest from the organic reagent by means of a saturated stripping aqueous solution in such a way that all the recovered metal precipitates as a metal salt. The metal salt is then mixed with a carbonaceous fuel and thermally decomposed in a reducing atmosphere until pure metal is obtained.

BACKGROUND

Development of high efficiency organic solvent extraction liquids has advanced the use of leaching as a process for recovery of metal values. Leaching of metals from ores is an extremely ancient process. Metal ores are contacted with a leach solution that dissolves metal values, producing a pregnant solution. The metal values were originally removed from solution, precipitating them with other substances, typically by means of a lower nobility metal; e.g., scrap iron for recovering copper by cementation. Another recovery route was direct electrowinning. Also, in some instances evaporation was employed. In all those cases the metal product was impure and low quality, so other processes were required for its refining.

Leaching has achieved greater commercial significance in recent years following development of solvent extraction media that can improve the purity and concentration of metals and regenerate leaching solutions. Such a technique employs an organic liquid immiscible with the leaching solution. The organic liquid includes reagents that combine with metal ions and withdraw metal ions from the leaching solution, replacing the metal, normally with hydrogen ion. The metal ions are then stripped from the organic liquid by another aqueous solution that regenerates the hydrogen ion in the organic liquid. For example, in a copper leaching process, a solvent extraction step removes copper from a pregnant solution and replaces the copper ion with two hydrogen ions. The organic solvent extraction medium is then stripped of copper with a sulfuric acid solution that replaces the hydrogen ions in the solvent extraction medium.

The solvent extraction process involves equilibrium between metal ion and hydrogen ion in the aqueous and organic phases. When the hydrogen concentration is high in the organic phase and low in the pregnant solution, metal ion transfers from the pregnant solution to the organic phase. During stripping the hydrogen concentration in the stripping solution is much higher than in the organic phase and exchange occurs to produce a higher metal concentration in the stripping solution than in the pregnant solution. The extraction and stripping steps can each involve plural stages with countercurrent flow to enhance efficiency. The solvent extraction medium is selected for its specificity for particular metal ions for enhancing purity in the stripping solution. For example, a solvent extraction liquid for copper has a much higher affinity for copper than for iron. This, although some iron can be transferred through the solvent extraction medium, copper concentraction can be greatly increased while iron conentration is very much lower.

The solvent extraction process is sometimes referred to as liquid ion exchange

Following solvent extraction the stripping solution is commonly processed in an electrowinning facility that produces metal as cathodes by electrolysis. For example, electrolytic reduction produces high quality cathode copper and simultaneously regenerates the sulfuric acid solution used in solvent extraction stripping.

Electrowinning is a costly operation which may not be readily usable. The capital investment required for electrowinning is relatively high and energy efficiencies are moderate at best. One difficult aspect of electrowinning is the requirement for large amounts of electric power which is often not readily available at remote locations where copper ore is to be processed. This can mean transportation of ore, solution, or electric power, and any can be costly.

Electrowinning may not be suitable for small ore bodies where leaching is useful since a relatively large, long lifetime electrowinning facility is needed for economic reasons. A small ore body can be depleted before the costs of the electrowinning facility are recouped. Electrowinning also uses large amounts of electricity which is costly as compared with other energy sources.

It is therefore desirable to provide a technique for producing metal that can be readily adapted to remote locations and which can be practiced with low capital investment and competitive operating costs.

BRIEF SUMMARY OF THE INVENTION

Solvent extraction may be used in the recovery of metal values from aqueous metal bearing solutions, coming from ore leaching, mine waters, bleeding from other processes, etc. Solvent extraction involves two steps. First is the selective extraction of the metal of interest from the aqueous metal bearing solution, into a suitable organic reagent. Secondly, the reagent is unloaded by means of another aqueous solution, normally of a very high acid content. This invention is characterized by unloading the organic reagent in the second solvent extraction step utilizing an aqueous stripping solution sufficiently concentrated with the metal of interest as to continuously precipitate crystals of a salt of said metal, which will remain temporarily suspended in the liquid phase. Crystals are separated, dehydrated, and thermally decomposed and reduced with a carbonaceous fuel to produce pure metal and gaseous products. The anions of the metal salt are recovered from said gaseous products.

For example, a copper ore can be leached to produce a copper rich pregnant solution. Copper ion is extracted selectively from the solution with an immiscible organic liquid. Copper is then stripped from the organic liquid with a sufficiently concentrated aqueous solution for precipitating copper sulfate which is separated from the stripping solution by settling or the like. The copper sulfate can be dehydrated, thermally decomposed to copper oxide, and pyrometallurgically reduced to metallic copper; preferably by mixing the copper sulfate with a solid carbonaceous fuel which is burned to produce heat for the process and the reducing environment needed for producing copper. Flue gas from the pyrometallurgical process contains sulfur dioxide which is recovered as sulfuric acid suitable for use in a leaching process.

DRAWINGS

These and other features and advantages of the present invention will be better understood by reference to the following detailed description when considered in conjunction with the accompanying drawing which is a block diagram or flow diagram of a presently preferred embodiment of practice of principles of this invention.

DESCRIPTION

This process can be subdivided into two separate groups of steps occurring sequentially. The first group of steps is indicated in the upper left-to-right band of operations illustrated in the drawing. This group comprises formation of a metal rich pregnant solution from which metal values are separated by solvent extraction in the form of a metal salt that is precipitated and separated from such liquids. The second group of steps is indicated by the lower left-to-right band of operations illustrated in the drawing. This group includes pyrometallurgical reduction of the metal salt to a metal that can be further refined. An acid suitable for the first group of steps is recovered from the gaseous products of the pyrometallurgical processing.

The two groups of steps can be performed in different locations with only the metal salt being transported. It will also be apparent from the following description that the subdivision between the two groups can be a somewhat different stage in the process than indicated in the drawing. Individual operations in these groups of steps can be understood by the description of an embodiment for recovering copper from a copper ore or the like.

An initial operation identified as leaching 10 in the drawing produces a copper rich pregnant solution. In a typical embodiment a copper ore is contacted with a leaching solution such as an aqueous solution of sulfuric acid. Preferably the leaching solution includes raffinate from solvent extraction as indicated in the drawing. The leaching solution can also include added acid, water or other ingredients as desired in a particular situation. For example, ferric ion may be included in the solution for enhancing dissolution of sulfide minerals of copper.

The leaching operation can have many variations as will be apparent to those skilled in the art. For example, a copper ore can be mined, crushed and placed in layers or heaps. A leaching solution can be applied to the layer or heap to percolate therethrough and produce a pregnant solution at the bottom of the layer or heap. A crushed copper ore can be vat leached in a process where leach liquid is introduced at the bottom of a bed of ore in a vat and pregnant solution is withdrawn from the top. Another suitable leaching process is agitation leaching where crushed or ground ore is mixed with a leaching solution.

Leaching can be conducted in situ where an ore remains in the ground. This can be in a true in situ leaching operation where, for example, wells are drilled into a subterranean formation and liquid is introduced and withdrawn from separated locations in the formation for extracting metal values while leaving the ore in place. This can also be in the form of modified in situ leaching where the ore is first fragmented explosively and liquids are then percolated through the resultant fragmented mass. A somewhat similar leaching operation can process low grade minerals that fill stopes from which higher grade ores have been mined. Leaching can also be conducted on tailings heaps, metallurgical slag heaps or can be essentially natural leaching operations where metal rich seepages from mines and ore bodies are processed. Pregnant solution can be made by leaching copper bearing scrap metals. Copper bearing waste solutions from various processes can also be employed in practice of this invention.

Pregnant solution from leaching or other copper rich solution is processed by solvent extraction 11. Solvent extraction is a conventional process in which an organic ion exchange liquid that is immiscible with the aqueous pregnant solution is first mixed with such solution and then separated. A variety of liquid ion exchange extractants suitable for solvent extraction of metals from pregnant solutions are commercially available. Suitable solvent extraction media for copper are, for example, LIX 64N, LIX 54 or LIX 70 available from Henkel Corporation, Tucson, Ariz., U.S.A.; SME 530 from Shell Chemical Company, The Netherlands; or P5100 from Imperial Chemical Industries, United Kingdom.

The solvent extraction medium has an affinity for copper and preferentially extracts copper from the aqueous pregnant solution. Copper ion extracted from the pregnant solution is replaced by hydrogen ion from the solvent extraction medium. The solvent extraction raffinate from which copper has been extracted is therefore regenerated in acid and can be reused in a leaching operation.

Solvent extraction of metal from pregnant solution can be conducted in a mixer-settler or other conventional apparatus. In a mixer-settler the organic and aqueous phases are mixed together to provide a high surface area of contact to promote ion exchange between the phases. The mixed liquids then flow to a more quiescent settling region where the aqueous and organic liquids separate or disengage due to density differences. Separate organic and aqueous streams can be withdrawn from the settler. If desired, two or more stages of solvent extraction can be used with the solvent extraction medium and the aqueous solution moving countercurrently between stages to promote efficiency of separation. Because of the high stripping efficiency feasible in practice of this invention, single stage solvent extraction can be practical.

The organic solvent extraction liquid loaded with copper goes to a stripping stage 12 where copper is reclaimed from the organic phase. The organic liquid stripped of its copper values is recycled for additional solvent extraction of copper from a pregnant solution. The copper is removed from the solvent extraction medium by contacting the organic with an aqueous solution that is more acidic than the pregnant solution. The solvent extraction reaction is reversed with copper in the organic phase being replaced by hydrogen ion as the copper ion transfers to the acidic stripping solution.

In practice of this invention the aqueous solution used for stripping copper from the loaded organic solvent extraction medium has a sufficiently high copper concentration that, after stripping copper from the organic liquid, the stripping solution is saturated. Continuous precipitation of copper sulfate crystals is obtained as the organic liquid is stripped of copper. The copper concentration in the stripping solution is kept sufficiently high that precipitation of the metal salt occurs as crystals at least temporarily suspended in a liquid phase thereby avoiding substantial crystallization on walls or other solid substrates which would result in difficult separation of the crystals from the liquid. Precipitation of crystals occurs largely at the interface between the organic and aqueous phases where additional copper ion transfers from the organic liquid to the stripping solution. It is here that the concentration of copper is highest in the stripping solution. In absence of previously formed crystals or other sites for crystal growth, the solution can become supersaturated until nucleation occurs and a new crystal grows. A steady stage of crystal formation and removal is soon established. By changing flow of liquids in the stripping stage or concentrations of the solutions, the steady state can be adjusted to control crystal formation.

Since precipitation of crystals occurs due to concentration of copper in the solutions, other techniques for promoting precipitation of the metal salt are avoided.

Stripping of solvent extraction reagent is prebably conducted in a mixer-settler. In a conventional mixer-settler the organic and aqueous phases are mixed in a first region such as by mechanical agitation. The phases then flow to a more quiescent settling region where gravity separation of the organic and aqueous phases occurs. The organic and aqueous phases can be withdrawn separately from the upper and lower portions of the settler.

In practice of this invention precipitation of solid crystals of copper sulfate can occur in the mixer section of the mixer-settler. The crystals remain temporarily suspended in the mixer because of the vigorous agitation used for contacting the aqueous and organic phases, and because the particles are small due to large surface contact areas between the liquid phases and the multitude of nucleation sites on recirculated particles. Larger crystals settle when the mixture flows to the settler section of the mixer-settler where the liquids are quiescent. Since crystals form in the liquid phase, they do not build up on surfaces, and can readily be removed from the settler.

A portion of such crystals may remain suspended in the organic solvent extraction medium, particularly those having small dimensions. This can be desirable to the extent that such crystals recirculate with the organic medium and can serve as nucleation sites for crystallization in subsequent stripping. Some of such recirculating crystals may be lost from the organic medium during solvent extraction of copper from the pregnant leaching solution. Copper values remain, however, in the organic medium. Some of the crystals may remain in suspension in the saturated aqueous solution from the stripping stage and are recycled to the stripping stage. Recycling such crystals is desirable for providing nucleation sites for subsequent stripping. Some of such crystals may be redissolved upon dilution of the saturated solution before it is recycled.

Most of the copper sulfate crystals are readily separated from the stripping solution by draining the solution from a slurry of crystals collected from a settler. The copper sulfate can be separated from liquid on a filter to obtain a reasonably dry filter cake. The separated crystals of copper sulfate are washed or rinsed with water in a wash stage 13. Such rinsing removes stripping solution which may contain iron or other impurities at concentrations too low to precipitate with the copper sulfate. Rinsing can also redissolve some precipitated impurities and remove traces of organic liquid. The result is substantially pure copper sulfate with very low levels of impurities.

If desired the wash liquid can contain acid or dissolved copper. The wash solution from the copper sulfate crystals is preferably mixed with the saturated stripping solution for recycling to the stripping stage. Such wash solution can be essentially saturated with copper sulfate and may not dilute the saturated solution sufficiently to redissolve copper sulfate crystals temporarily suspended in the saturated stripping solution. If desired the wash solution from rinsing the crystals can be recycled to the organic liquid with pregnant solution for minimizing accumulation of impurities.

The amount of water added for washing the copper sulfate is proportioned to provide a balance with the water withdrawn as water of crystallization and entrapped water in the copper sulfate, and water withdrawn as a bleed solution to minimize accumulation of impurities. It is desirable to use water free of impurities to minimize contamination of copper sulfate with the entrapped water. Washing or rinsing can be in any convenient mixer or can be by percolation. Removal of liquid both before and after rinsing such as by a centrifuge or filter is desirable for minimizing contamination.

Sulfuric acid is also added to the recycled stripping solution to provide hydrogen ion for stripping copper from the solvent extraction medium and for replenishing sulfate ion removed by precipitation of copper sulfate. A small amount of aqueous liquid is bled from the stripping stage to minimize the build-up of impurities in the saturated stripping solution which might contaminate copper sulfate crystals. Copper or other metal values can be separately extracted from this bleed stream and reprocessed by solvent extraction or otherwise recovered. The bleed stream can be from the wash solution, if desired, but is preferably part of the stripping solution.

If desired, separated copper sulfate can be redissolved and reprecipitated to improve purity but extra energy would be needed. The redissolved copper sulfate could also be further purified by a second solvent extraction, stripping and precipitation operation but that is not considered necessary in most circumstances.

The separated copper sulfate crystals are dried by mild heating in a drying operation 14. In many instances solar heating can be sufficient for drying the copper sulfate. When the temperature is maintained below about 25° C. the copper sulfate is in a pentahydrate form. When the temperature is raised above about 110° C. the crystals decompose to a monohydrate. Such crystals are referred to as $CuSO_4 \cdot nH_2O$ in the drawing. The crystals can be heated above about 250° C. for complete dehydration if desired.

The dried crystals of copper sulfate, typically copper sulfate pentahydrate, are an intermediate product in the process. This product can be produced at a remote location where facilities for electrowinning cathode copper from solvent extraction stripping solution is uneconomic or infeasible. The product can be economically transported from such a remote location to other facilities for completing the process. Both the copper moiety and the sulfate moiety in this product have high value and can be recovered for utilization.

The second aspect of the process involves pyrometallurgical reduction of copper sulfate to produce copper. Although indicated in the drawing as series of separate steps it will become apparent that many of such steps can be performed in a substantially continuous countercurrent operation in a single apparatus.

The first step is to dehydrate the copper sulfate in a dehydration stage 16 in the event the copper sulfate has not previously been dehydrated. This removes the water of crystallization and produces anhydrous copper sulfate. Dehydration occurs at temperatures of up to about 250° C. where copper sulfate monohydrate is completely decomposed.

Continued heating of the copper sulfate in a thermal decomposition stage 17 slowly decomposes the copper sulfate at temperatures above about 250° C. until all of the copper sulfate is decomposed at temperatures in the range of about 650° to 900° C. Products of thermal decomposition of copper sulfate are cupric oxide and sulfur dioxide. Dehydration and thermal decomposition of copper sulfate are functions of time and temperature and in industrial implementation of this process, the temperatures mentioned are only approximate.

The next stage of processing is pyrometallurgical reduction 18 of the copper oxide to metallic copper at elevated temperature in a reducing environment. Reduction of the copper oxide and preferably dehydration and thermal decomposition of copper sulfate are performed by mixing the copper sulfate with a solid carbonaceous fuel such as coal, coke, charcoal, petroleum coke or the like to form a permeable mass. Other liquid or gaseous carbonaceous fuels may also be employed. The carbonaceous fuel is ignited and air is introduced to support a combustion zone. Air is introduced to the combustion zone and hot combustion gases pass through the fragmented mass for heating the copper sulfate and fuel. The resultant elevated temperatures dehydrate, decompose and reduce copper sulfate to metallic copper. It is particularly desirable to heat the permeable mass sufficiently to melt the resultant copper and directly produce molten copper which can be cast into anodes, ingots, or other shapes. Such cast copper from a melting stage 19 may contain some oxygen but is otherwise comparable to fire refined quality copper.

It is desirable to proportion the fuel and air so that reduction of copper oxide results in carbon dioxide with very little, if any, carbon monoxide in the gas flowing to the thermal decomposition stage. This is of significance since sulfur is readily removed by decomposition of the copper sulfate and is removed with some difficulty from copper after reduction. Thus, completion of thermal decomposition before reduction of copper oxide commences is preferable in order to avoid sulfur contamination in the final product.

Alternatively stated, sulfur removal should occur in solid-gas reactions before any melting of copper occurs. Carbon monoxide from combustion can react with copper sulfate in the range of about 600° to 800° C. to produce carbon dioxide, sulfur dioxide and solid copper powder. Careful control is needed to prevent premature melting of the copper which can result in sulfur contamination which is difficult to remove.

Reduction of copper from copper sulfate with carbonaceous fuel is economically practiced whereas other reducing agents such as hydrogen are exorbitantly costly. Hydrogen is also hazardous and not readily available in remote locations whereas carbonaceous fuels can be easily and economically transported and used. Solid carbonaceous fuels are preferred to form permeable mixtures with the copper sulfate, but fuel oil, kerosene, or liquefied petroleum gas may also be used.

It is desirable to perform the dehydration, decomposition, reduction and melting steps in a single continuous operation. This can be done, for example, in a water jacketed vertical blast furnace to produce molten copper and a small amount of slag. A rectangular blast furnace with tuyeres along the sides, generally resembling a lead blast furnace, can be used. The charge to the blast furnace is introduced at the top and comprises substantially pure copper sulfate and solid carbonaceous fuel, preferably coke which has mechanical strength and helps maintain permeability of the column of solids moving downwardly through the furnace. A rather small amount of flux can be included for producing a liquid slag with ash from the coke. Preferably, a carbonaceous fuel is used that has very low levels of impurities that can appear in the copper. Since the copper sulfate charged to the blast furnace is of high purity, very little slag is produced. This is desirable since unreduced copper oxide can combine with oxide slags and decrease the recovery from the process. If desired any slag from the blast furnace can be reprocessed for recovering the small amount of copper that may be in it.

The process in a blast furnace is essentially a series of reactions between an uprising current of hot gas and a countercurrent slowly moving solid charge. By controlling the amount of air introduced through the tuyeres and the quantity of solid carbonaceous fuel, the gas stream can be made reducing, neutral or oxidizing as desired. A fairly strong reducing atmosphere and high temperature are required to reduce the copper oxide and produce molten copper from the furnace. Molten copper collects in a crucible or hearth at the bottom of the furnace and is withdrawn through a tap hole or a siphon tap. The small amount of slag can be tapped through a conventional slag spout near the upper part of the hearth.

In such a blast furnace the charge of copper sulfate and coke near the top of the bed is heated by uprising gases for dehydrating the copper sulfate. As the bed settles downwardly through the blast furnace toward higher temperature zones, thermal decomposition of the dehydrated copper sulfate occurs. Still further down the furnace shaft adjacent an active combustion zone near the tuyeres, reduction of copper oxide occurs to produce metallic copper. Such copper may temporarily exist as solid copper or reduction directly to liquid copper may occur, depending on the temperatures and strength of the reducing environment at various elevations in the furnace. Melting or maintenance of copper in the molten state occurs at an elevation near the tuyeres and the resultant molten copper collects in the hearth at the bottom of the furnace. When the copper is tapped from the furnace, it can be cast into ingots, anodes, or other shapes or can go directly as molten copper to a fire refining step 20 in the event further refining is desired.

Air is introduced to the permeable mass in the blast furnace by way of the tuyeres and may be preheated, enriched with oxygen, or augmented with additional fuel as desired. The air reacts with solid carbonaceous fuel in the furnace to produce elevated temperatures and combustion gases including carbon monoxide. The carbon monoxide (along with water vapor, nitrogen, and the like which do not react in the process) flows upwardly through the furnace charge to the reduction zone 18 where continued combustion with carbonaceous fuel occurs, resulting in metallic copper and carbon dioxide. Gas containing carbon dioxide continues upwardly through the furnace charge into the thermal decomposition zone 17 where copper sulfate is decomposed to copper oxide and sulfur dioxide. These gases, which are still at elevated temperature, continue upwardly through the dehydration zone 16 and are withdrawn through a flue or flues at the upper part of the furnace.

These flue gases from the dehydration step can contain about 3 to 15% sulfur dioxide. This sulfur dioxide is utilized in an acid recovery step 21 for producing sulfuric acid. Because of the high concentration of sulfur dioxide in the flue gas, it is quite easy to make concentrated sulfuric acid in a conventional sulfuric acid plant. Concentrated sulfuric acid can be added to the recycled solution used for stripping copper from the solvent extraction medium or can be used to augment the raffinate in leaching operation.

Alternatively, sulfur dioxide gas can be dissolved in aqueous solution and by oxidizing, particularly in the presence of iron, dilute sulfuric acid can be formed, as practiced before strong acid plants were available. Sulfur dioxide and air can be introduced into solution containing ferrous ion and there is oxidation to sulfuric acid and/or ferric sulfate. The proportions of sulfuric acid and ferric sulfate are controlled by the ratio of air and sulfur dioxide. Such dilute sulfuric acid can be employed in leaching processes and can be particularly useful for relatively small scale operations or remote locations.

Alternatively, copper sulfate can be dehydrated and thermally decomposed in a multiple hearth roaster, tunnel kiln, rotary kiln, fluidized bed, or other suitable heating apparatus. This can be done at a location near the situs of the leaching, solvent extraction and stripping steps. Such roasting results in gas containing a high concentration of sulfur dioxide which can go directly to an acid recovery plant for production of concentrated sulfuric acid. Such sulfuric acid can then be used directly in the leaching and solvent extraction processes. The resultant copper oxide can be shipped to another location for pyrometallurgical reduction.

When a solid carbonaceous fuel is mixed with the copper sulfate in a multiple hearth furnace or the like, reduction roasting can produce metallic copper. Reduction roasting can also be conducted in a permeable mass on a Dwight-Lloyd sintering machine or a circular grate roaster such as made by Dravo Corporation.

In such apparatus a permeable mass of copper sulfate and carbonaceous fuel is formed in a layer on a permeable, movable grate. The upper surface of the layer is ignited and air is introduced from above. The combustion zone moves downwardly through the layer as combustion gases are withdrawn from the bottom of the layer. A series of windboxes can be used so that gases withdrawn from the bottom of one part of the layer are recycled to the top of another part of the layer. The movable grates carry the permeable layer through such windboxes. Such an embodiment has countercurrent gas flow and the operations indicated in the drawing progress in a generally linear sequence as illustrated.

One of the easier embodiments to implement uses a rotary kiln since control of the process is straightforward. In such an embodiment the carbonaceous fuel may be fuel oil, pulverized coal, natural gas or the like, in addition to or in lieu of solid carbonaceous fuel mixed with the copper sulfate. Copper sulfate is charged into one end of the rotary kiln and gradually progresses along its length. A flame in the opposite end provides heating for gas flow countercurrent to the flow of solids through the kiln. Such a kiln can be used for all or part of the pyrometallurgical processing by controlling maximum temperature and the oxidation reduction potential in the kiln. The kiln can discharge copper oxide, solid copper or molten copper.

Copper oxide or copper from such roasting operations can be reduced and/or melted in a conventional reverberatory furnace such as used for matte smelting. In such an embodiment the reverberatory melting furnace preferably serves as a fire refining step 20. A fire refining furnace can be charged directly with molten copper. If there are appreciable impurities in the copper they can be oxidized by air introduced by "flapping" the surface of the molten copper or by blowing compressed air or oxygen into the molten metal bath or by adding copper oxide. When the impurity levels are low, as is characteristic of practice of this process since the copper is produced by reducing substantially pure copper sulfate, little if any additional oxidation may be needed. Cuprous oxide remaining from the reduction operation has appreciable solubility in the molten copper and the bath is therefore "poled" to reduce the cuprous oxide to metallic copper. In a typical poling operation long poles of green wood are inserted into the molten copper bath. The high temperatures decompose or destructively distill the wood and the resultant reducing gases react with the cuprous oxide to form metallic copper. Poling is continued until the bath contains very little oxygen and it can then be cast as "tough pitch copper". It is preferred to produce such cast copper as the final product since its extremely low impurity content makes its value about the same as electrorefined copper.

Alternatively, copper from the melting step 19 can be cast into copper anodes and these anodes are used in an electrorefining step 22. In the electrorefining process copper is dissolved from the anodes into a sulfuric acid electrolyte and is plated onto cathode starter sheets to form high purity cathode copper. Electrorefining is desirable for producing copper known to have high market value. Such electrorefining can be conducted with about 1/10 the energy expenditure that is needed for direct electrowinning of cathode copper from solvent extraction stripping solution. The current required for electrowinning and for electrorefining is substantially identical. The voltage requirements for electrowinning are, however, very much larger than for electrorefining since inert anodes (commonly a lead-calcium alloy) are used instead of copper anodes. Extra energy is required due to the resultant anode voltage. Exemplary voltages are about 0.21 to 0.25 for electrorefining and about 2.1 volts for electrowinning. Further, electrorefining can be conducted at a site remote from the balance of the process whereas electrowinning is conducted on the stripping solution from solvent extraction.

A process as hereinabove described makes feasible the use of newly developed solvent extraction media that require very high acid concentrations in the stripping solution. For example, a solvent extraction reagent known as LIX 70 available from Henkel Corporation requires sulfuric acid concentrations of 300 to 400 grams per liter. It is desirable to use LIX 70 since it is highly selective for copper, thereby rejecting iron and other impurities which may be present in the pregnant solution. Such high concentrations of sulfuric acid in the stripping solution are, however, unsuitable for direct electrowinning of copper from the solvent extraction solution. The high acid concentrations result in heavy corrosion of the lead anodes used in electrowinning and there can be substantial decomposition of sulfuric acid in the electrowinning circuit with consequent corrosion, health hazards, and pollution.

High acid concentration in the solvent extraction stripping solution assures thorough stripping of copper from the organic solvent extraction medium in a single stage of stripping. It also helps precipitation of the copper sulfate by driving the stripping to higher concentrations of copper in the stripping solution and by lowering the solubility as compared with solubility of the copper sulfate in lower concentration solutions of acid due to the common ion effect.

Precipitation of copper sulfate crystals in the stripping solution is advantageous as compared with electrowinning the copper since the effect of impurities transferring through the solvent extraction medium is diminished. Impurities can build up in the stripping solution to near saturation without significantly contaminating the copper sulfate. Much lower levels of impurities in electrowinning electrolyte can contaminate the final product.

The entire hydrometallurgical portion of the process can operate at ambient temperature since precipitation is induced by concentration of the stripping solution. Other temperatures are suitable, but require extra energy.

The technique also makes it feasible to employ hydrochloric acid or the like in the solvent extraction stripping solution with precipitation of a metal chloride. Hydrochloric acid is unsuitable for use in the direct electrowinning process, unless complicated diaphragm cells are employed.

A process as hereinabove described is desirable when both the first and second groups of steps are performed at the same location. The capital investment to pyrometallurgically produce the metallic copper from the stripping solution is about one-fourth of the capital investment required for an electrowinning plant of similar capacity. Further, an electrowinning plant produces spent electrolyte with low acid concentration which limits the suitability of the electrolyte to serve as an optimum stripping solution for the solvent extraction system. A low concentration of acid in the stripping solution may make it necessary to use a solvent extraction medium that is less selective for copper than media that are stripped with high concentration acid solutions. The lower selectivity of such media can result in higher levels of impurities passing through the solvent extraction and stripping steps, thereby producing higher levels of impurities in the final product or requiring larger amounts of bleed to dissipate such impurities.

Since the flue gases in this process have high sulfur dioxide content and concentrated sulfuric acid can readily be made, this process makes it economically feasible to conduct a number of separate leaching operations dispersed over a mining district with solvent extraction and precipitation of copper sulfate at each such location. Such copper sulfate is readily transported to a common pyrometallurgical recovery facility for production of metallic copper and concentrated sulfuric acid. The concentrated sulfuric acid can be readily and economically shipped back to the leaching sites as required, or can be sold as a separate product.

This process makes feasible international transactions with leaching, solvent extraction separation of copper sulfate occurring at remote locations and the pyrometallurgical processing being conducted at sites nearer the marketplace for the copper. The sulfuric acid byproduct finds a ready market in any industrial country.

Alternatively, roasting through the thermal decomposition stage can be practiced at a remote location to produce sulfuric acid near where it is used. The resultant copper oxide is then shipped to another location for reduction to copper. Such copper oxide can be converted to copper oxychloride if desired. It should be apparent that this process can be interrupted at a variety of stages for producing a variety of products. Exemplary intermediate products that can be marketed include copper sulfate, copper oxide, copper powder (which may include ash particles from the carbonaceous fuel) and copper anodes.

Although described in terms of a presently preferred embodiment involving sulfuric acid leaching of copper, precipitation of copper sulfate and pyrometallurgical reduction to copper, the technique is also applicable to other leaching systems and metal values which may be treated by solvent extraction.

Considerable flexibility is available in the feed liquid used as the pregnant solution. Ammoniacal solutions can be used for leaching copper, nickel and/or cobalt. A nitrate leachant for sulfide copper ores can be feasible using LIX 34 as a solvent extraction medium. For another example, an aqueous carbonate leaching system for nickel can be used and the solvent extraction medium is stripped with a sulfuric acid solution to produce nickel sulfate crystals. It might be noted that with such an embodiment, different anionic species can be employed in the leaching and stripping solutions since there is little, if any, transfer of anions through the solvent extraction medium. For example, chlorides can be used in the leaching operation and sulfuric acid for stripping.

Thus, the solvent extraction liquid can be stripped of metal values with strong inorganic acid such as hydrochloric or nitric acid. Somewhat weaker acids such as phosphoric, formic, or acetic acid, can be suitable for stripping metal values from some solvent extraction media. Any acid can be used that will strip metal values from the solvent extraction medium and form a precipitatable metal salt. Exemplary of other metals recoverable by such a process are gold, silver, cadmium, iron, zinc, nickel, cobalt, and mercury. Sulfate leaching solutions are suitable for copper, zinc, iron, nickel, cobalt, cadmium and mercury. Chlorides can be used for copper, iron, nickel, cobalt, gold and silver. Cyanides and thiourea can also be used for gold and silver. Ammoniacal solutions are usable for copper, nickel and cobalt. The process is also adaptable to recovery of lead, tin, and manganese, although mineral species of these metals tend to be intractable for leaching solutions.

Many other modifications and variations will be apparent to one skilled in the art. It is therefore to be understood that within the scope of the appended claims, this invention may be practiced otherwise than as specifically described.

What is claimed is:

1. A metal recovery process comprising the steps of:
    contacting an aqueous solution containing metal ion selected from the group consisting of copper, zinc, iron, nickel, cobalt, gold, silver, cadmium, lead, tin, manganese and mercury with an immiscible organic liquid for selectively extracting such metal ion from the aqueous solution and replacing such metal ion with hydrogen ion from the organic liquid;
    contacting the organic liquid with a strongly acidic aqueous solution containing a sufficient concentration of such metal ion for precipitating sufficiently small crystals of a salt of such metal that such crystals at least temporarily remain suspended in such a liquid phase and replenishing hydrogen ion in the organic liquid;
    separating the precipitated metal salt crystals from such liquid phase;
    recycling the organic liquid for contacting additional aqueous solution;
    dehydrating the metal salt;
    pyrometallurgically reducing the metal salt with a carbonaceous fuel and producing gaseous products; and
    recovering the anion portion of the metal salt from the gaseous products.

2. A process as recited in claim 1 further comprising the steps of:
    washing the metal salt crystals for removing impurities; and
    adding the wash liquid to the strongly acidic solution.

3. A process as recited in claim 1 wherein the step of reducing the metal salt comprises:
    mixing the metal salt with a solid carbonaceous fuel;
    igniting the fuel; and
    introducing sufficient air for burning such fuel while maintaining a reducing environment for such metal salt.

4. A process as recited in claim 1 wherein the metal salt comprises a sulfate and the recovering step comprises producing concentrated sulfuric acid from such gaseous products.

5. A process as recited in claim 1 wherein the metal salt comprises a sulfate and the recovery step comprises oxidizing sulfur dioxide in the gaseous products in aqueous solution in presence of iron for producing a sulfuric acid solution.

6. A process for recovering copper values comprising the steps of:
    selectively extracting copper ion from an aqueous copper rich solution with an immiscible organic liquid;
    stripping copper from the organic liquid with a sufficiently strong acid containing sufficient copper for precipitating a substantially pure copper salt;
    separating the copper salt from the acid;
    dehydrating the copper salt;
    pyrometallurgically reducing the copper salt to metallic copper with a carbonaceous fuel; and
    recovering the anionic moiety of the copper salt for replenishing the strong acid.

7. A process as recited in claim 6 wherein the step of pyrometallurgically reducing the copper salt comprises:
    mixing the copper salt with a solid carbonaceous fuel;
    igniting the fuel; and
    introducing sufficient air for burning such fuel while maintaining a reducing environment adjacent to the copper.

8. A copper recovery process comprising:
    mixing substantially pure copper sulfate with a solid carbonaceous fuel for forming a permeable mass;
    igniting a portion of the carbonaceous fuel;
    introducing sufficient air for burning such fuel while maintaining a sufficiently heated reducing environment for thermally decomposing the copper sulfate and producing sulfur dioxide in a first portion of the permeable mass and for producing metallic copper in a second portion of the permeable mass;
    passing heated gases from the second portion of the permeable mass through the first portion of the permeable mass; and
    producing concentrated sulfuric acid from such sulfur dioxide.

9. A process for recovering copper comprising the steps of:
    mixing substanially pure copper sulfate a solid carbonaceous fuel for forming a permeable mass:
    burning the solid carbonaceous fuel in the permeable mass for thermally decomposing the copper sulfate and producing sulfur dioxide and for producing metallic copper, and wherein substantially all of the sulfur is removed in solid-gas reactions; and
    converting the sulfur dioxide to sulfuric acid.

10. A process as recited in claim 9 comprising:
    establishing a combustion zone in the permeable mass;
    introducing air into the combustion zone for burning such fuel and producing combustion gases; and
    passing such combustion gases countercurrently through the permeable mass for such thermal decomposition of copper sulfate in the permeable mass.

11. A process as recited in claim 9 wherein the converting step comprises introducing the sulfur dioxide and air into an aqueous solution in presence of iron for producing a sulfuric acid solution.

12. A process for recovering copper values from an aqueous pregnant solution containing copper ion comprising the steps of:
    extracting cooper ion from the pregnant solution with an immiscible organic liquid;
    stripping copper ion from the organic liquid by contacting the organic liquid with a sulfuric acid solution having a sufficient copper concentration for precipitating substantially pure copper sulfate due to saturation of said acid solution;
    separating such precipitated copper sulfate from the sulfuric acid solution;
    thermally decomposing the copper sulfate for forming copper oxide and sulfur dioxide; and
    forming sulfuric acid from such sulfur dioxide.

13. A process as recited in claim 12 further comprising the steps of:
    mixing the copper sulfate with a solid carbonaceous fuel; and
    burning such fuel for thermally decomposing the copper sulfate and for pyrometallurgically producing metallic copper.

14. A process as recited in claim 12 further comprising the steps of melting the metallic copper; fire refining the molten copper; and casting the molten copper into solid shapes.

15. A process as recited in claim 12 further comprising the steps of:
mixing the copper oxide with a solid carbonaceous fuel; and
burning such fuel for pyrometallurgically producing metallic copper.

16. A process as receited in claim 12 comprising:
introducing the copper sulfate into a rotary kiln;
burning a carbonaceous fuel in the rotary kiln for producing heat and combustion gases; and
passing the combustion gases countercurrently to copper sulfate through the rotary kiln for thermally decomposing the copper sulfate.

17. A process as recited in claim 12 further comprising the steps of:
mixing the copper sulfate with a solid carbonaceous fuel for forcing a permeable mass;
establishing a combustion zone in the permeable mass;
introducing air into the combustion zone for burning such fuel and producing combustion gases; and
passing such combustion gases countercurrently through the permeable mass for such thermal decomposition of copper sulfate in the permeable mass, and wherein substantially all of the sulfur is removed in solid-gas reactions.

18. A copper recovery process comprising the steps of:
leaching a copper ore with solvent extraction raffinate containing sulfuric acid for producing a pregnant solution containing copper ion;
solvent extracting copper ion from the pregnant solution with an immiscible organic liquid and replacing copper ion in such solution with hydrogen ion for producing solvent extraction raffinate for such leaching;
stripping copper from the organic liquid with an aqueous sulfuric acid solution containing a sufficient concentration of copper for precipitating copper sulfate and replacing copper in the organic solution with hydrogen ion;
separating such copper sulfate from the aqueous solution;
rinsing the separated copper sulfate and recycling the rinse solution to the aqueous sulfuric acid stripping solution;
mixing the copper sulfate with a solid carbonaceous fuel for forming a permeable mass;
igniting such carbonaceous fuel for establishing a combustion zone in the fragmented mass;
introducing air into the combustion zone for burning the carbonaceous fuel and producing combustion gases;
passing such combustion gases countercurrently through the permeable mass for successively (a) thermally decomposing copper sulfate and producing copper oxide and sulfur dioxide, and (b) reducing the copper oxide to meiallic copper;
recovering sulfur dioxide from the combustion gases and producing sulfuric acid; and
replenishing the aqueous solution with such sulfuric acid.

19. A process as recited in claim 18 further comprising the steps of:
melting the copper;
casting the copper into anodes; and
electrorefining the anodes into cathodes.

20. A copper recovery process comprising the steps of:
leaching a copper ore with solvent extraction raffinate for producing a pregnant solution containing copper ion;
selectively extracting copper ion from the pregnant solution with an immiscible organic liquid and replacing copper ion in such solution with hydrogen ion for producing solvent extraction raffinate for such leaching;
stripping copper from the organic liquid with aqueous sulfuric acid solution containing a sufficient concentration of copper for precipitating substantially pure copper sulfate crystals that remain at least temporarily suspended in the solution, and replacing copper in the organic solution with hydrogen ion;
separating such copper sulfate crystals from the aqueous solution;
burning a carbonaceous fuel for generating heat and combustion gases; and
passing such combustion gases countercurrently to the copper sulfate for successively (a) thermally decomposing copper sulfate and producing copper oxide and sulfur dioxide; and (b) reducing the copper oxide to metallic copper wherein substantially all of the sulfur is removed in solid-gas reactions.

21. A process as recited in claim 20 further comprising the steps of recovering sulfur dioxide from the combustion gases and producing concentrated sulfuric acid and adding the sulfuric acid to the aqueous solution.

22. A process as recited in claim 20 further comprising the step of oxidizing the sulfur dioxide with air in aqueous solution in presence of iron for producing a sulfuric acid solution.

23. A process as recited in claim 20 further comprising the steps of:
melting the copper;
casting the copper into anodes; and
electrorefining the anodes into cathodes.

* * * * *